United States Patent [19]

Solodar

[11] Patent Number: 4,624,708

[45] Date of Patent: Nov. 25, 1986

[54] SULFONATED TRISAZO DYES FOR INK JET COMPOSITIONS

[75] Inventor: Warren E. Solodar, Rochester, N.Y.

[73] Assignee: Xerox Corporation, Stamford, Conn.

[21] Appl. No.: 723,376

[22] Filed: Apr. 15, 1985

[51] Int. Cl.[4] ............................................. C09D 11/02
[52] U.S. Cl. ...................................................... 106/22
[58] Field of Search ........................................... 106/22

[56] References Cited

U.S. PATENT DOCUMENTS

| | | | |
|---|---|---|---|
| 4,235,773 | 11/1980 | Huhne et al. | 260/173 |
| 4,255,327 | 3/1981 | Brode | 260/173 |
| 4,279,814 | 7/1981 | Smith | 260/173 |
| 4,443,371 | 4/1984 | Brulard et al. | 260/169 |

FOREIGN PATENT DOCUMENTS

| | | |
|---|---|---|
| 572993 | 5/1959 | Belgium . |
| 2255652 | 5/1973 | Fed. Rep. of Germany . |
| 76475 | 6/1981 | Japan . |
| 82860 | 7/1981 | Japan . |
| 104977 | 8/1981 | Japan . |

*Primary Examiner*—Amelia B. Yarbrough
*Attorney, Agent, or Firm*—E. O. Palazzo

[57] ABSTRACT

An ink jet composition useful for jet printing processes comprised of an aqueous solution of a sulfonated trisazo black dye selected from the group consisting of:

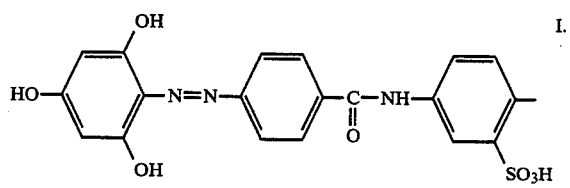

I.

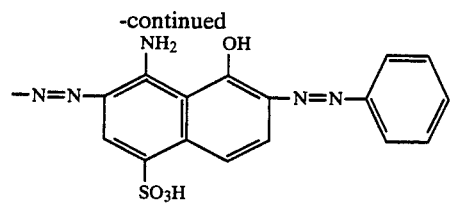

-continued

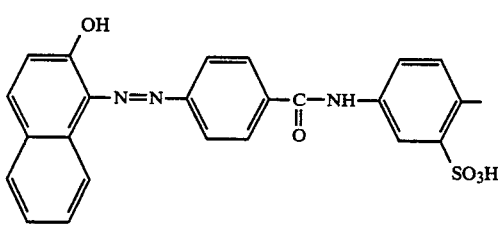

II.

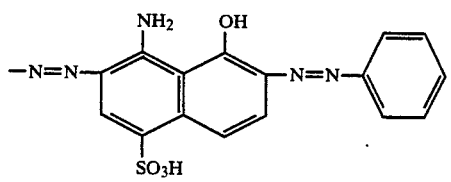

and

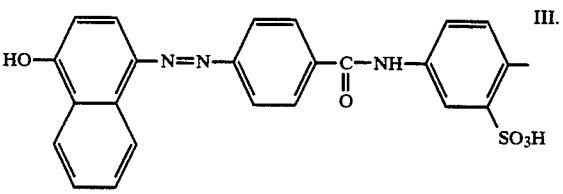

III.

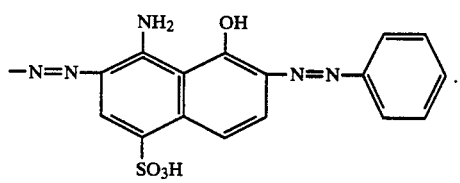

.

8 Claims, No Drawings

SULFONATED TRISAZO DYES FOR INK JET COMPOSITIONS

BACKGROUND OF THE INVENTION

The present invention is generally directed to ink jet compositions useful in various imaging systems; and more specifically, the present invention is directed to sulfonated trisazo black dyes useful in ink jet printing processes. Accordingly, in one embodiment of the present invention there is provided aqueous ink compositions having incorporated therein nonmutagenic sulfonated trisazo black dyes. Moreover, the ink jet compositions of the present invention have improved waterfastness in comparison to several of the prior art compositions; and furthermore, the substantivity of the sulfonated trisazo dyes illustrated hereinafter in addition to possessing the desirable property of nonmutagenicity have improved affinity for various substrates such as paper.

Compositions useful in ink jet printing systems are well known, which compositions generally contain water soluble dyes. There is thus disclosed, for example in U.S. Pat. No. 3,846,141, an ink composition useful in jet printing, comprised of an aqueous solution of a water-soluble dye and a humectant material formed of a mixture of a lower alkoxy triglycol, and at least one other compound selected from the group consisting of a polyethylene glycol, a lower alkyl ether of diethylene glycol, and glycerol. According to the disclosure of this patent, such printing inks have the desired viscosity for use in jet printing in that the viscosity of the composition is subjected to little variation with use as water is lost by evaporation during recirculation of the ink composition through the jet printer. Moreover, apparently the humectant system disclosed in this patent substantially prevents or minimizes tip drying of the printing ink in the orifice or nozzle during down time of the printer, such as when the printer is rendered inoperative. As further disclosed in this patent, the basic imaging technique in jet printing involves the use of one or more ink jet assemblies connected to a pressurized source of ink. Each individual ink jet includes a very small orifice usually of a diameter of 0.0024 inches, which is energized by magneto restrictive piezo-electric means for the purpose of emitting a continuous stream of uniform droplets of ink at a rate of 33 to 75 kilohertz. This stream of droplets is desirably directed onto the surface of a moving web of, for example, paper; and is controlled to form printed characters in response to video signals derived from an electronic character generator and in response to an electrostatic deflection system.

Also, there is disclosed in U.S. Pat. No. 4,279,653 ink jet compositions containing water-soluble wetting agents, a water-soluble dye and an oxygen absorber. Similarly, U.S. Pat. No. 4,196,007 describes an ink jet printing composition containing an aqueous solution of a water-soluble dye and a humectant consisting of at least one water-soluble unsaturated compound. Other patents disclosing aqueous inks for ink jet printing include U.S. Pat. Nos. 4,101,329; 4,290,072 and 4,299,630.

Furthermore, disclosed in U.S. Pat. No. 4,383,859 are processes for the preparation of inks wherein the ink concentrate is processed in a specific manner including subjecting it to the operational stress of an elevated temperature of about 50° C. Examples of useful dyes selected for the aforementioned process include purified nigrosine dyes, reference column 3, beginning at line 58. According to the disclosure of this patent, the invention offers a specific advantage of nigrosine dye in an ink in that high concentrations of this dye can be selected, and further it is toxicologically a safe dye, reference column 4, beginning at line 18.

There is disclosed in U.S. Pat. No. 4,235,773 trisazo dyestuffs which are suitable for dyeing natural or synthetic fiber materials, such as cotton, regenerated cellulose, wool and paper. A similar teaching is present in U.S. Pat. No. 4,255,327 which discloses a new group of trisazo compounds that are useful as direct dyes for cellulose textiles, paper, and leather. These dyes, which were intended to replace the widely used paper dye known as C.I. Direct Black 38, are water-soluble tri or tetrasulfonic acid compounds of the structure as illustrated in column 1, beginning at line 1, for example. Also, a similar teaching is provided in U.S. Pat. Nos. 4,270,814; 4,443,371 and 4,286,989. While the present invention is directed to ink jet compositions having incorporated therein similar dyes as disclosed in these prior patents, which are mutagenic to various extents in that they fail the Ames tests, an important critical difference resides in the use of specific sulfonated dyes which are nonmutagenic as indicated hereinafter.

Accordingly, thus there continues to be a need for new inks for ink jet printing and processes for preparing these compositions. Additionally, there continues to be a need for ink jet compositions, which when in use result in superior optical print densities, and have excellent waterfastness characteristics. Moreover, there is a need for new dyes possessing desirable nonmutagenic characteristics enabling them to be safely used in ink jet printing processes.

SUMMARY OF THE INVENTION

It is an object of the present invention to provide ink compositions and processes for preparing such compositions which overcome some of the above-noted disadvantages.

In another object of the present invention there are provided ink jet compositions with superior optical print density and excellent waterfastness characteristics.

In a further object of the present invention there are provided ink jet compositions having incorporated therein nonmutagenic sulfonated trisazo dyes.

In yet a further object of the present invention there are provided processes for modifying the known trisazo dye, Direct Black 38, which has had wide commercial acceptance, but nevertheless is strongly mutagenic, thereby enabling sulfonated dyes with nonmutagenic characteristics.

These and other objects of the present invention are accomplished by the provision of novel ink compositions for jet printing comprised of sulfonated trisazo dyes, and processes for preparing these compositions. More specifically, in one embodiment, the present invention is directed to ink compositions having incorporated therein sulfonated trisazo dyes selected from the group consisting of compounds of the following formulas:

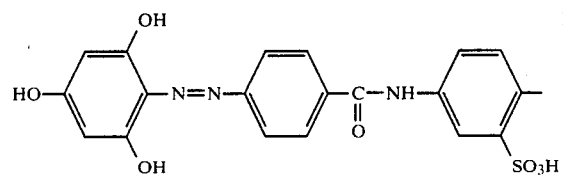

I.

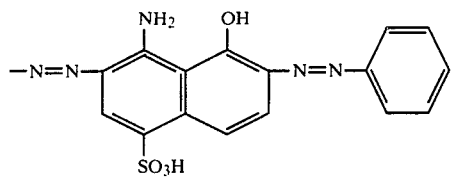

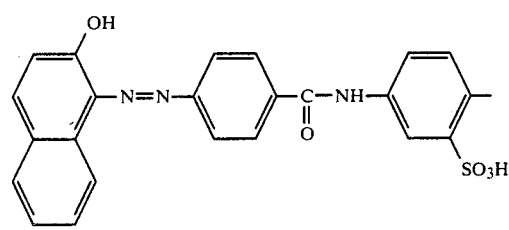

II.

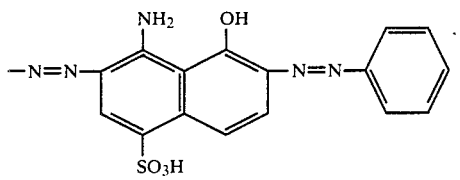

and

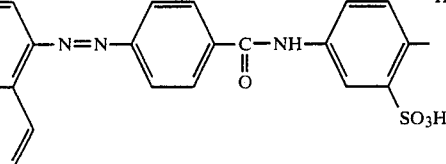

III.

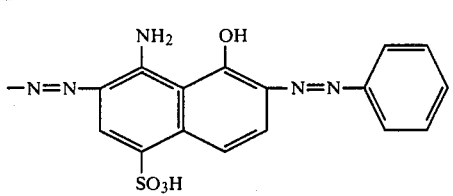

Other similar sulfonated trisazo dyes can be selected for the ink compositions of the present invention inclusive of those wherein the hydroxy end groups situated at the left of each formula can be replaced by naphthol groups and other known hydroxylated aromatic compounds such as phenols, xylenols, and the like. Alternatively, the naphthalene moieties positioned at the right of each of the above formulas can be varied with other sulfonated naphthols or aminonaphthols inclusive of H-acid (1amino-8-hydroxy-3,5-naphthalenedisulfonic), gamma acid (2-amino-8-hydroxy-6-naphthalenesulfonic acid), chromotropic acid (4.5-dihydroxy naphthalene-2,7-disulfonic acid), and the like. Additional specific sulfonated trisazo dyes thus encompassed within the present invention include those of the following formulas:

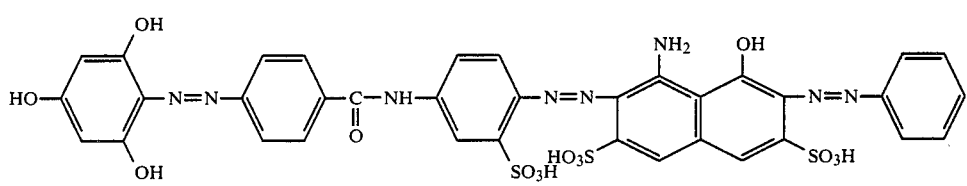

IV.

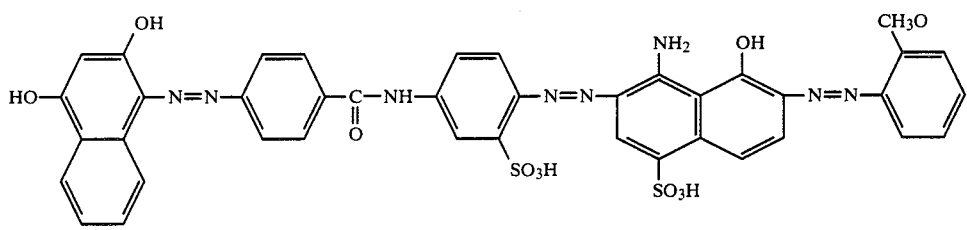

V.

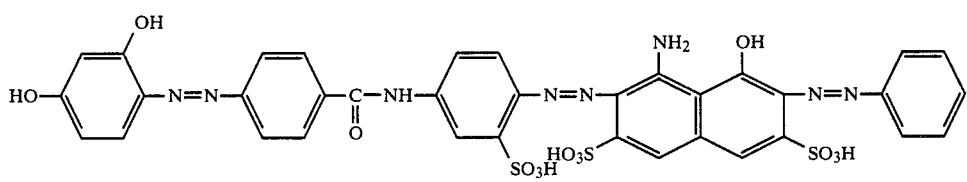

VI.

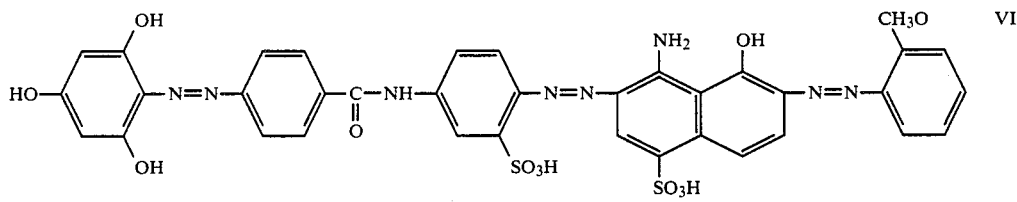

VII.

These dyes are generally present in the ink composition in effective amounts. Generally, however, from about 1 percent by weight to about 10 percent weight of the sulfonated trisazo dyes are incorporated into the ink composition.

It is critical to the present invention with respect to eliminating undesirable toxic properties that the dyes be sulfonated. This is affected by significantly modifying the structure of the trisazo dye, Direct Black 38, wherein the benzidene moiety present therein is replaced by sulfonated diaminobenzanilide, and wherein phenolic end groups are substituted for the m-phenylene-diamine moieties of the Direct Black 38. More specifically, the aforementioned reaction scheme is as illustrated with reference to the following equations:

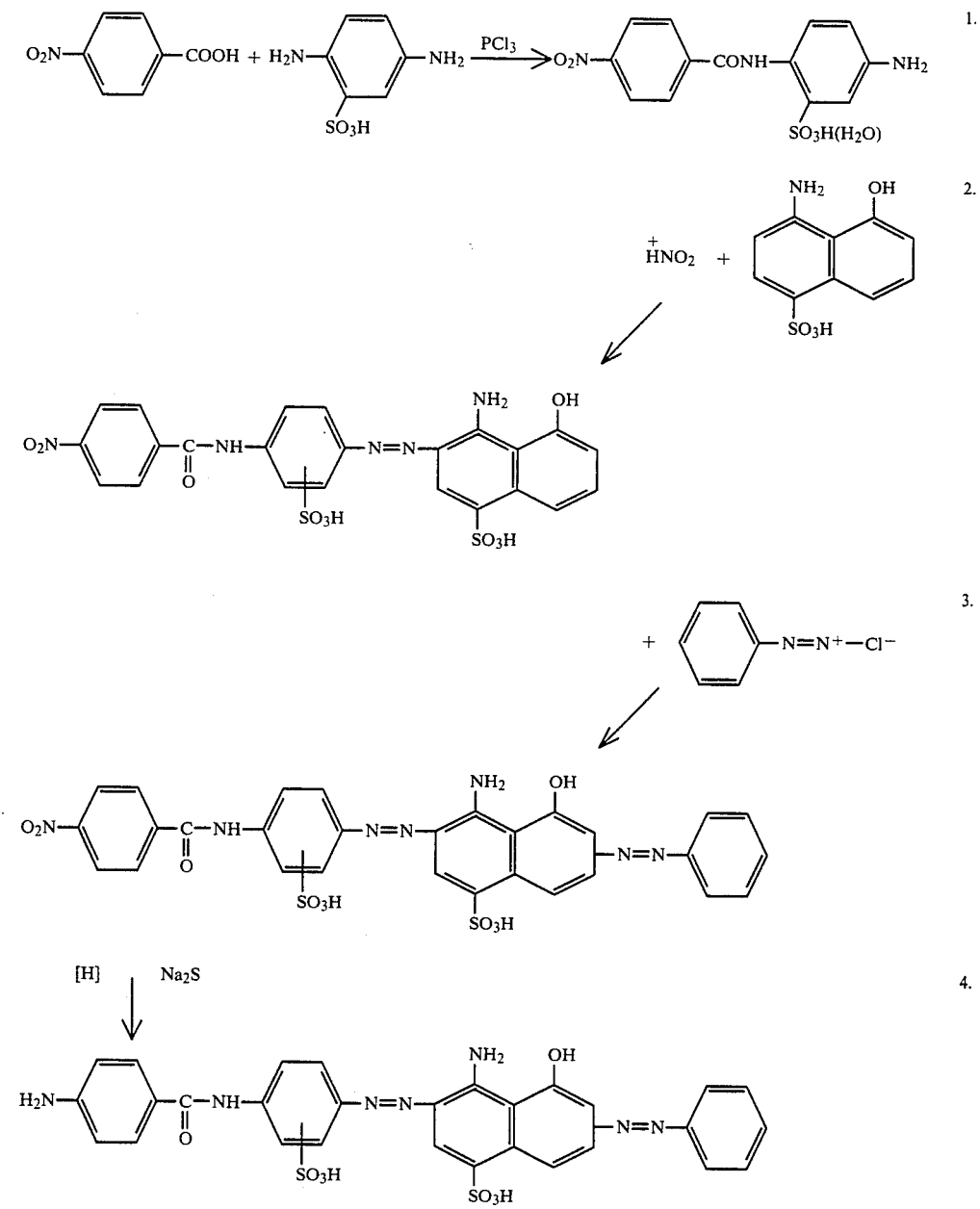

-continued

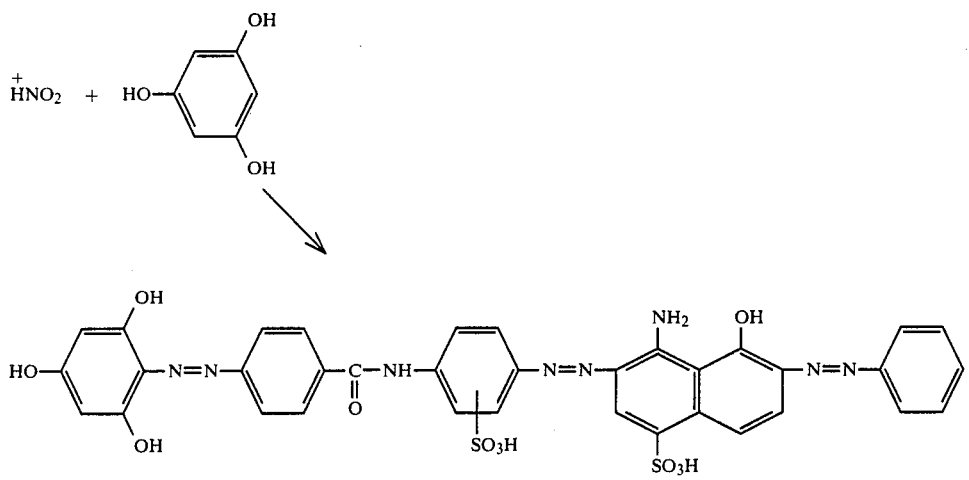

5.

With regard to Reaction 1, which enables formation of the amide indicated, this product can be obtained by known methods inclusive of those described in Grimmel and Gunther, British Pat. No. 610952, of Oct. 22, 1948, the disclosure of which is totally incorporated herein by reference. The resulting amide is a gray powder of the formula $C_{13}H_{11}N_3O_6S \cdot H_2O$ with a carbon content of 43.78 percent, a hydrogen content of 3.65 percent, a nitrogen content of 12.46 percent, and a sulfur content of 9.36 percent. Reaction 2 involves known diazotization processing, wherein the diazotized amine is coupled into a sulfonated acid at a pH of about 4. Thereafter, a second coupling is affected, reference Reaction 3, by raising the pH of the resulting mixture to 9 thus enabling one equivalent of diazotized aniline to be coupled into the second active site of the sulfonic acid. A reduction reaction is then accomplished for the mixture wherein specifically the nitro group present therein is reduced to an amine by heating the mixture on a steam bath with 1.5 equivalents of sodium sulfide ($Na_2S$), Reaction 4. Cooling of the mixture followed by acidification results in a precipitated product which can be collected by filtration. Subsequently, the final dyd diazotization, reaction 5, and coupling is affected by the diazotization of the above intermediate with nitrous acid by well known process. Accordingly, the intermediate amine is coupled into an alkaline solution of phloroglucinol followed by precipitating the product by acidification.

This process enables dyes that are nonmutagenic and possess the other desirable properties as illustrated hereinbefore. Specifically, reference to the following Table provides a listing of prior art compounds and their mutagenic characteristics in comparison to the nonmutagenic characteristics of the sulfonated dyes of the present invention. These mutagenic characteristics were determined in the following manner.

Dye samples were tested for mutagenicity by Litton Bionetics, Inc. of Kensington, Md., using the standard Ames technique as described in *Methods for Detecting Carcinogens and Mutagens with the Salmonella/Mammalion—Microsome Mutagenicity Test*, B. Ames, J. McCann, and Yamasaki, Mutation Research 31, 347–364 ( 1975), the disclosure of which is totally incorporated herein by reference.

TABLE I

MUTAGENIC CHARACTERISTICS

| DYE | AMES SIGNAL |
|---|---|
| DIRECT BLACK 19 (WATERFASTNESS 64 PERCENT) 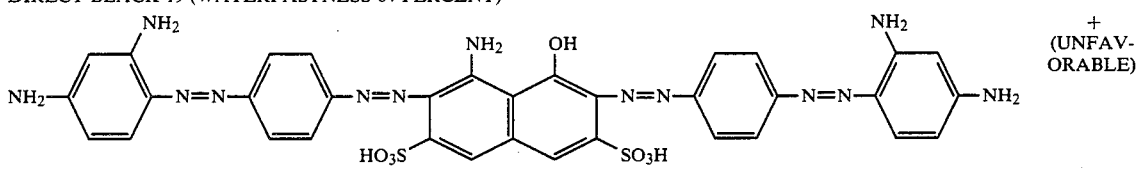 | + (UNFAVORABLE) |
| DIRECT BLACK 38 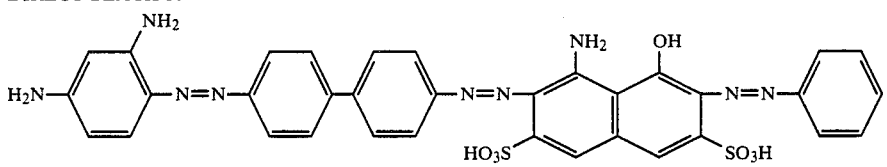 | + |
| DIRECT BLACK GB-NB (NONBENZIDINE-AVAILABLE FROM FABRICOLOR INC.) (WATERFASTNESS 67 PERCENT) | |

TABLE I-continued
MUTAGENIC CHARACTERISTICS

| DYE | AMES SIGNAL |
|---|---|
| [Structure: 2-amino-6-hydroxyphenyl—N=N—phenyl—CONH—phenyl—N=N—(8-amino-1-hydroxy-3,6-disulfonaphthyl)—N=N—phenyl] <br> ANALOG OF DIRECT BLACK GB-NB | + |
| [Structure: 2,4-dihydroxyphenyl—N=N—phenyl—CONH—phenyl—N=N—(8-amino-1-hydroxy-3,6-disulfonaphthyl)—N=N—phenyl] <br> SULFONATED TRISAZO DYE OF PRESENT INVENTION <br> (WATERFASTNESS 80 PERCENT) | + |
| [Structure: 2,6-dihydroxyphenyl—N=N—phenyl—C(=O)—NH—(3-sulfophenyl)—N=N—(8-amino-1-hydroxy-5-sulfonaphthyl)—N=N—phenyl] | − (FAVORABLE) |

The ink compositions of the present invention have incorporated therein other known components rendering them useful in ink jet printing processes. Accordingly, these inks, in addition to the sulfonated triazo dyes illustrated, normally comprise a major amount of water, preferably 80 to 90 percent by weight, biocides, chelating agents, buffers, humectants, and various additives for the purpose of assisting in the penetration of the ink particles into paper substrates.

Therefore, illustrative examples of specific ink compositions are comprised of the dyes of the present invention, reference those of Formulas I and II illustrated hereinbefore, dispersed in an appropriate solution. Specific ink compositions include those comprised of 4 percent by weight of the dyes of Formulas I or II, 83.2 percent by weight of water, 5 percent by weight of sodium hydroxide sodium bicarbonate buffer solution, 7.5 percent by weight of Carbowax 200, 0.1 percent by weight of Dowicil 75, and 0.2 percent by weight of EDTANa$_4$. Dowicil is a biocide commercially available from Dow Chemical; EDTANa$_4$ is a chelating agent comprised of the sodium salt of ethylene diamine tetra-cetic acid incorporated for the primary purpose of binding heavy metal ions, while Carbowax 200 is a humectant, consisting of polyethylene glycol with an average molecular weight of from about 190 to 210, commercially available from Union Carbide.

Other specific useful compositions include those containing about 5 percent by weight of the dyes of Formulas, I, II or III, 82.2 percent by weight of water, 5 percent by weight of a sodium hydroxide sodium bicarbonate buffer solution, 7.5 percent by weight of Carbowax 200, 0.1 percent by weight of Dowicil 75, and 0.2 percent by weight of the chelating agent EDTANa$_4$, the sodium salt of ethylene diamine tetra-acetic acid; and 6 percent by weight of the dyes of Formulas I or II, 86.7 percent by weight of Super Q water, 5.0 percent by weight of a concentrated buffer solution consisting of sodium hydroxide and sodium bicarbonate, 2.0 percent by weight of benzyl alcohol, 0.1 percent by weight of Dowicil 75, and 0.2 percent by weight of EDTANa$_4$.

The following examples are being provided to further define various species of the present invention, it being noted that these examples are intended to be illustrative only, and are not intended to limit the scope of the present invention; parts and percentages are by weight unless otherwise indicated.

EXAMPLE I

There was prepared a sulfonated dye by reacting 6.75 grams of 4'-nitro-4-aminobenzanilide-3-sulfonic acid, prepared by the method as described in Grimmel and Gunther, which acid was diazotized with nitrous acid and coupled into a chilled suspension of 4.6 grams of 8-amino-1-naphthol-5-sulfonic acid in water at a pH of 4. Thereafter, the pH was increased by 9 by the addition of sodium hydroxide and one equivalent of benzene diazonium chloride aniline was slowly added thereto. The resulting mixture was then stirred in an ice bath for 2 hours, followed by adding thereto 7.2 grams of the hydrated sodium sulfide Na$_2$S.9H$_2$O. The resulting mixture was then stirred and heated on a steambath for 2 hours, and subsequent to cooling, was acidified with 25 milliliters of concentrated hydrochloric acid. The separated precipitated product was filtered and dried yielding 10.7 grams, 83 percent yield, of an amino intermediate of the following formula:

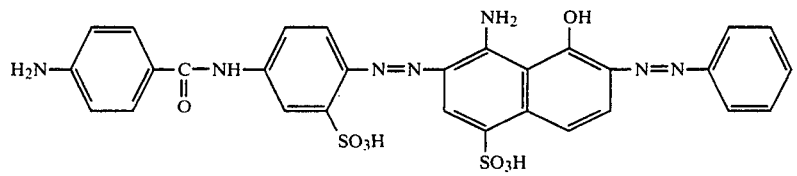

Subsequently, 5.35 grams of the above-prepared amino intermediate was diazotized with nitrous acid and coupled into an alkaline solution of 1.2 grams of phloroglucinol dihydrate. Acidification with concentrated hydrochloric acid resulted in a precipitated product, which after drying weighed 5.8 grams, 97 percent yield. This precipitated product had the following formula, and provided a negative Ames signal. Also, a 0.4 percent aqueous solution of the precipitated product had a surface tension of (Fisher Surface Tenscomat Model 21) 51 dynes/cm$^2$, a viscosity of 2.4 (Brookfield LV Viscometer), and an optical density on paper of 0.76 (Macbeth 527 Densitometer):

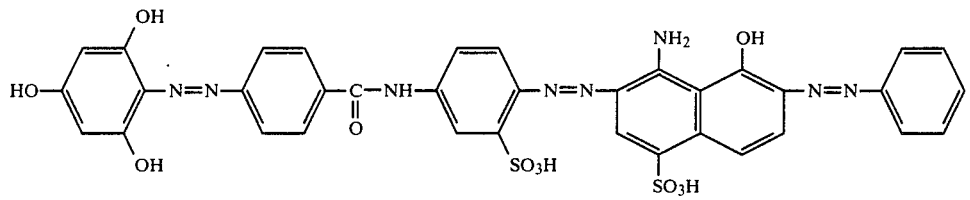

EXAMPLE II

The process of Example I was repeated with the exception that there was prepared an unsulfonated analog dye, no SO$_3$H substituent on the phenyl amide group, by selecting 6.2 grams of 4,4'-diaminobenzanilide as a substitute for the 4'-nitro-4-aminobenzanilide-3-sulfonic acid. There resulted 5.2 grams of the unsulfonated analog of the following formula, which analog possessed a positive Ames signal:

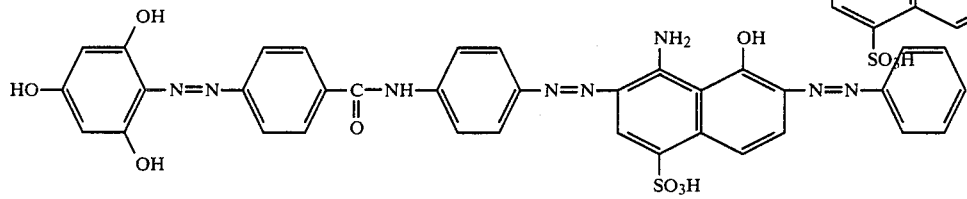

EXAMPLE III

An ink composition was prepared by mixing 4 percent by weight of the sulfonated dye as prepared in accordance with Example I, 88.7 percent by weight of water, 5 percent by weight of a buffer solution consisting of sodium hydroxide and sodium bicarbonate, 2 percent by weight of benzyl alcohol, 0.1 percent by weight of the biocide Dowicil 75, and 0.2 percent by weight of chelating agent EDTANa$_4$. Admixing was continued for a sufficient period of time to form a solution, and subsequently the resulting mixture was filtered through a 5.0 micron filter.

These ink compositions, as well as others that can be prepared in a similar manner, are useful for permitting the development of images in known ink jet printing processes, including drop on demand, (Type III), and continuous stream (Type I).

Other modifications of the present invention may occur to those skilled in the art based upon a reading of the present disclosure, and these modifications are intended to be included within the scope of the present invention.

I claim:

1. An ink composition useful for ink jet printing processes comprised of an aqueous solution of a sulfonated trisazo black dye selected from the group consisting of:

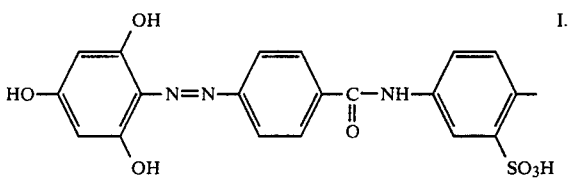

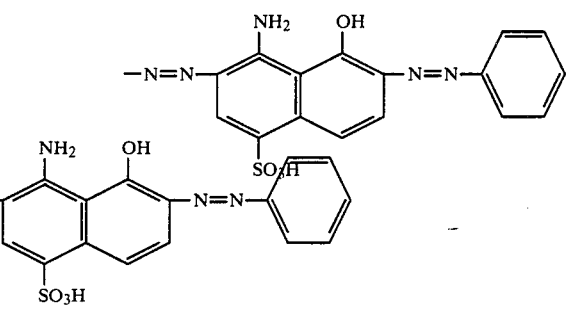

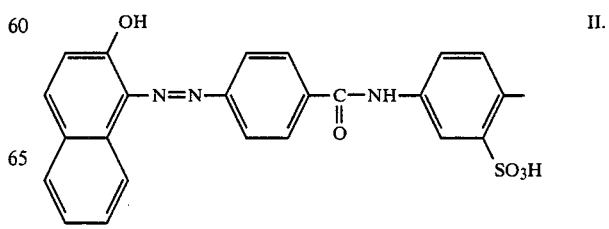

-continued

3. A composition in accordance with claim 1, wherein the sulfonated black dye is of the formula:

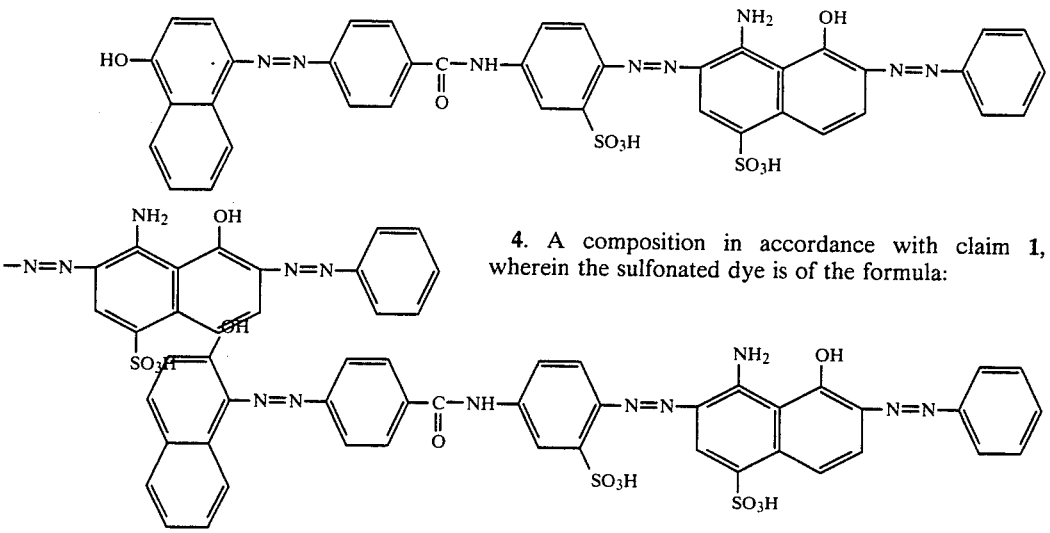

4. A composition in accordance with claim 1, wherein the sulfonated dye is of the formula:

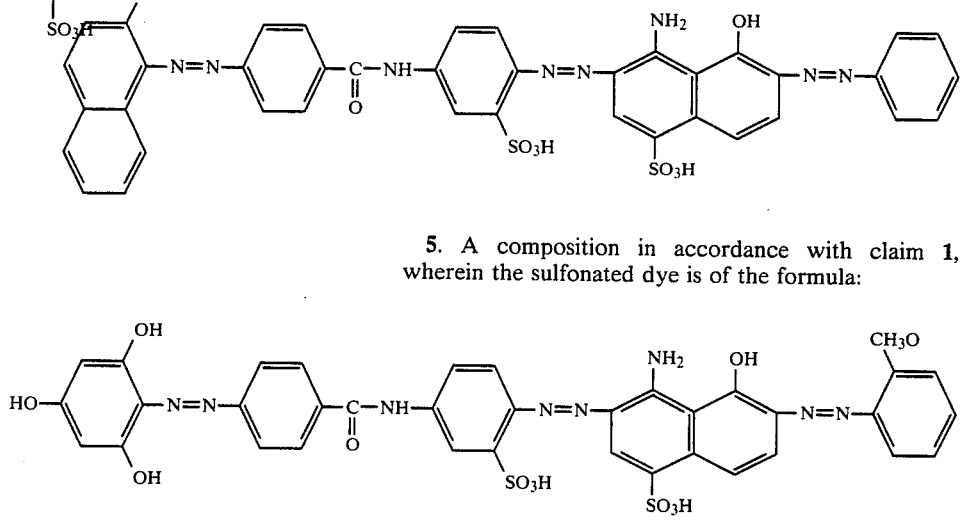

5. A composition in accordance with claim 1, wherein the sulfonated dye is of the formula:

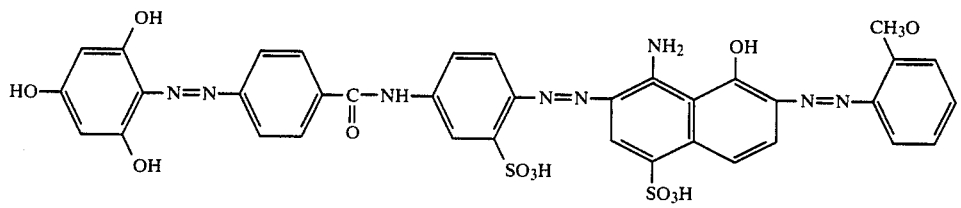

and

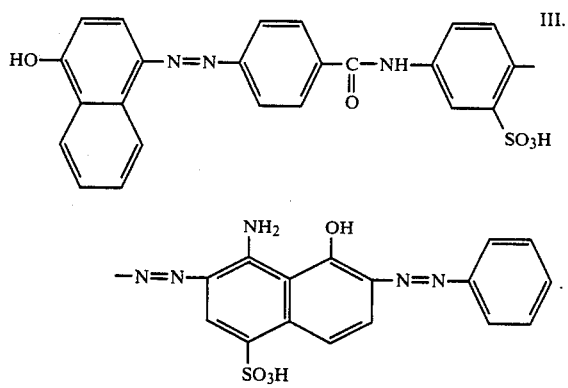

III.

6. A composition in accordance with claim 1, wherein the sulfonated dye is present in an amount of from about 1 percent by weight to about 10 percent by weight.

7. A composition in accordance with claim 1, wherein the aqueous solution contains water in an amount of from about 80 percent by weight to about 90 percent by weight.

8. An ink composition useful for ink jet printing processes consisting essentially of an aqueous solution of a sulfonated trisazo black dye selected from the group consisting of

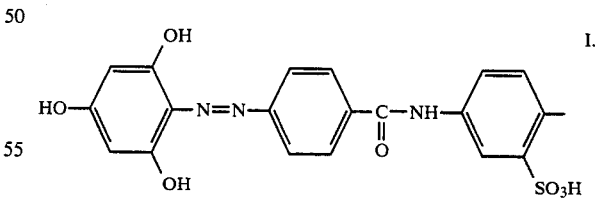

I.

2. A composition in accordance with claim 1, wherein the sulfonated black dye is of the formula:

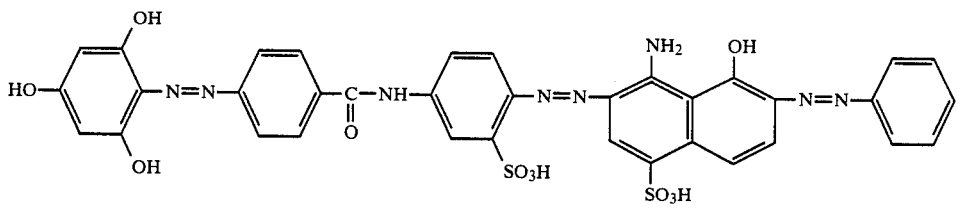

-continued
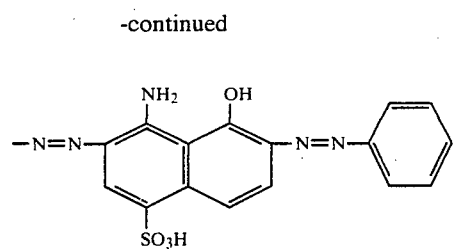
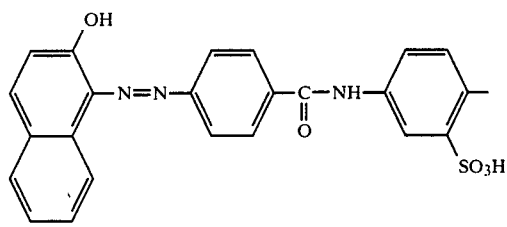
II.
-continued
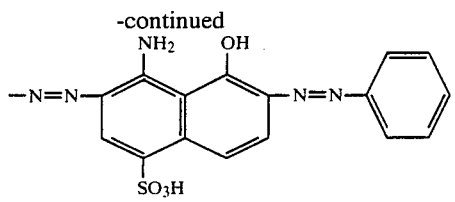
and
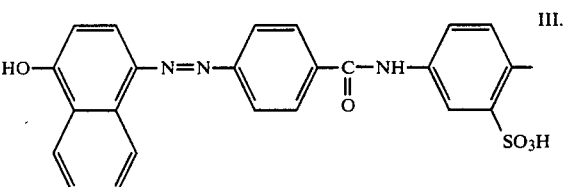
III.
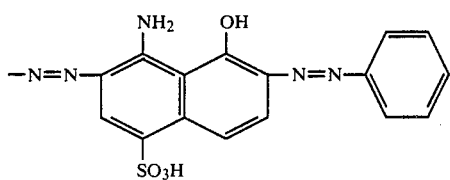
* * * * *